United States Patent [19]

Whitcomb

[11] Patent Number: 4,793,097
[45] Date of Patent: Dec. 27, 1988

[54] PLANT CONTAINER HANDLING AND PROTECTION SYSTEM

[75] Inventor: Carl E. Whitcomb, Stillwater, Okla.

[73] Assignee: Lacebark Publications, Stillwater, Okla.

[21] Appl. No.: 911,712

[22] Filed: Sep. 26, 1986

[51] Int. Cl.$^4$ .............................................. A01G 9/02
[52] U.S. Cl. ......................................... 47/86; 47/39; 211/72; 211/74
[58] Field of Search ................... 47/39, 85, 86, 73, 63, 47/65, 67; 220/23.4; 24/664, 662; 211/74, 4; 248/154, 313

[56] References Cited

U.S. PATENT DOCUMENTS

| | | | |
|---|---|---|---|
| 1,274,947 | 8/1918 | Seitz | 292/76 |
| 3,660,934 | 5/1972 | Pollack et al. | 47/34.11 |
| 3,664,062 | 5/1972 | Danielson | 47/34.13 |
| 3,664,497 | 5/1972 | Mascia | 220/23.4 |
| 3,667,159 | 6/1972 | Todd | 47/34.13 |
| 3,818,634 | 6/1974 | Dugan-Chapman | 47/34.13 |
| 3,825,126 | 7/1974 | Pohl et al. | 211/71 |
| 3,889,416 | 6/1975 | Bergeron et al. | 47/39 |
| 4,120,396 | 10/1978 | Mascia et al. | 220/23.4 |
| 4,144,672 | 3/1979 | Gradwell et al. | 47/73 |
| 4,202,460 | 5/1980 | Imbeault | 220/23.4 |
| 4,205,485 | 6/1980 | Olsen | 47/77 |
| 4,261,957 | 4/1981 | Schimanski | 248/213.2 |

*Primary Examiner*—Richard J. Johnson
*Attorney, Agent, or Firm*—Laney, Dougherty, Hessin & Beavers

[57] ABSTRACT

A frame unit for protecting and maintaining a plurality of uniform plant containers therein as each container is affixed to the frame unit around the container upper extremity in sealed manner so that the plant container bottoms may rest on the earth's surface in normal disposition. The frame unit assures dead air space thereabeneath while allowing container bottoms to rest directly on the ground. Each of the frame units includes a gripping means to enable manual movement in unison of plural plant containers, and each of the frame units includes sealing edge joinder means so that a plurality of frame units can be assembled into a frame array of preselected size wherein a much larger number of plant containers may be supported in operative position.

24 Claims, 3 Drawing Sheets

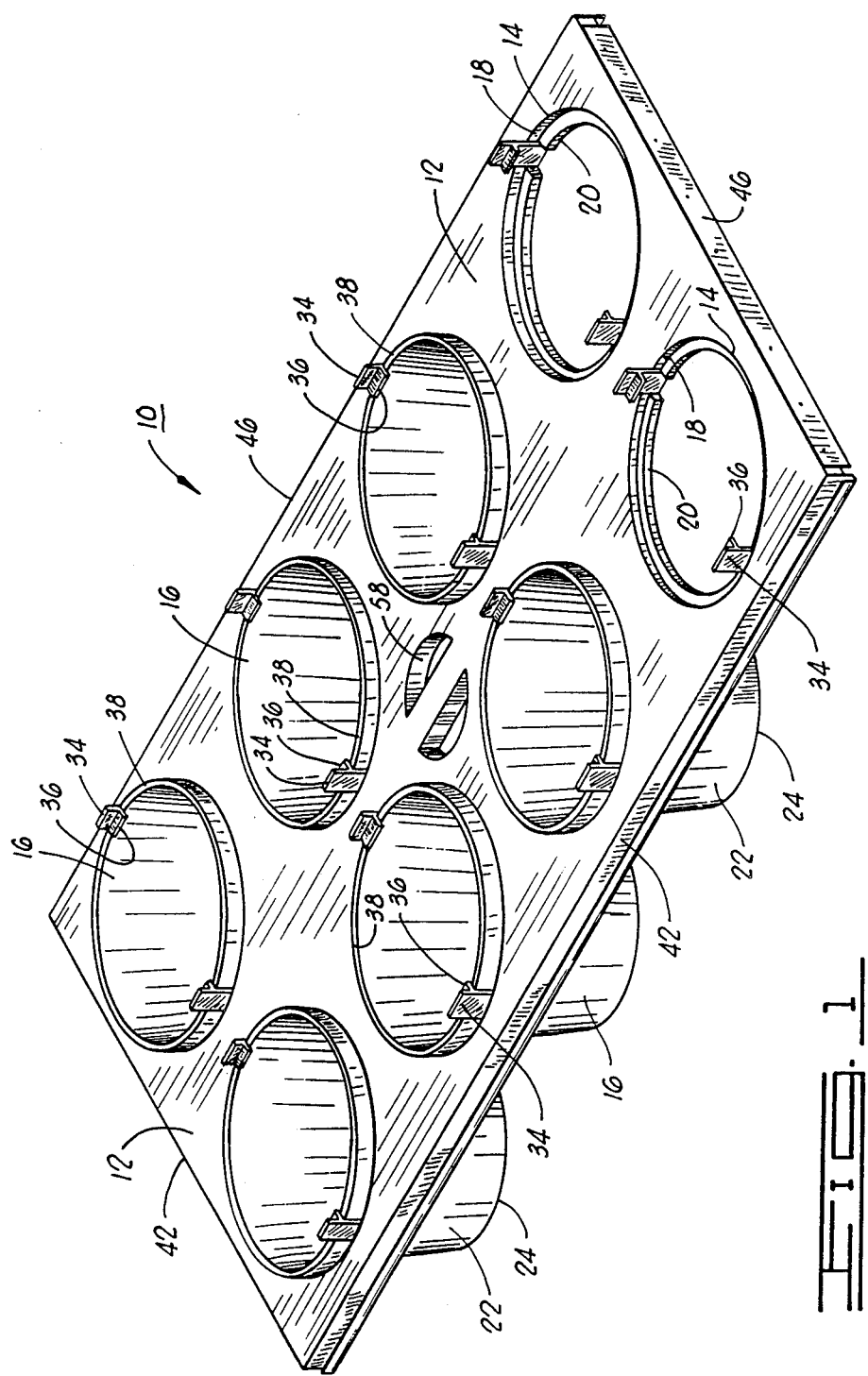

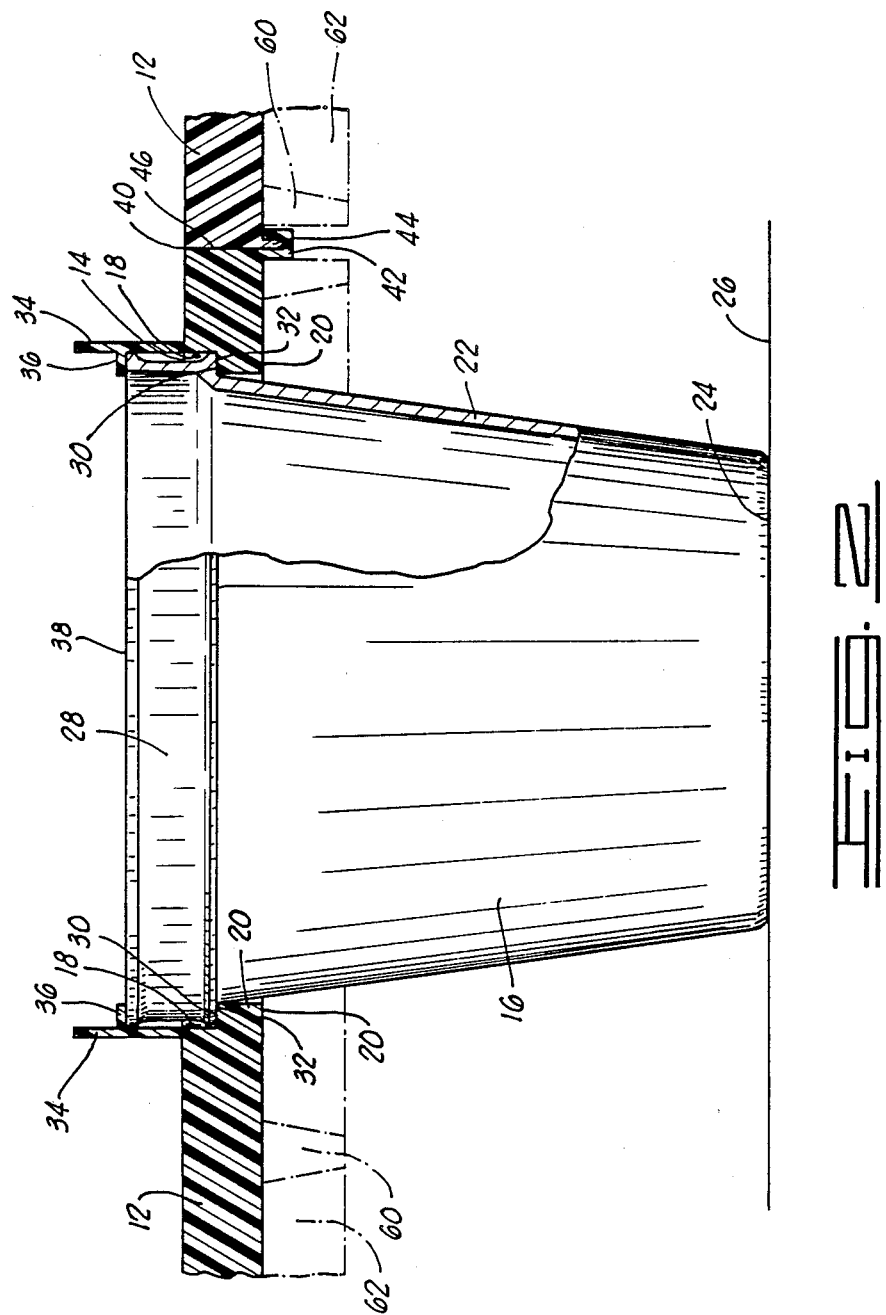

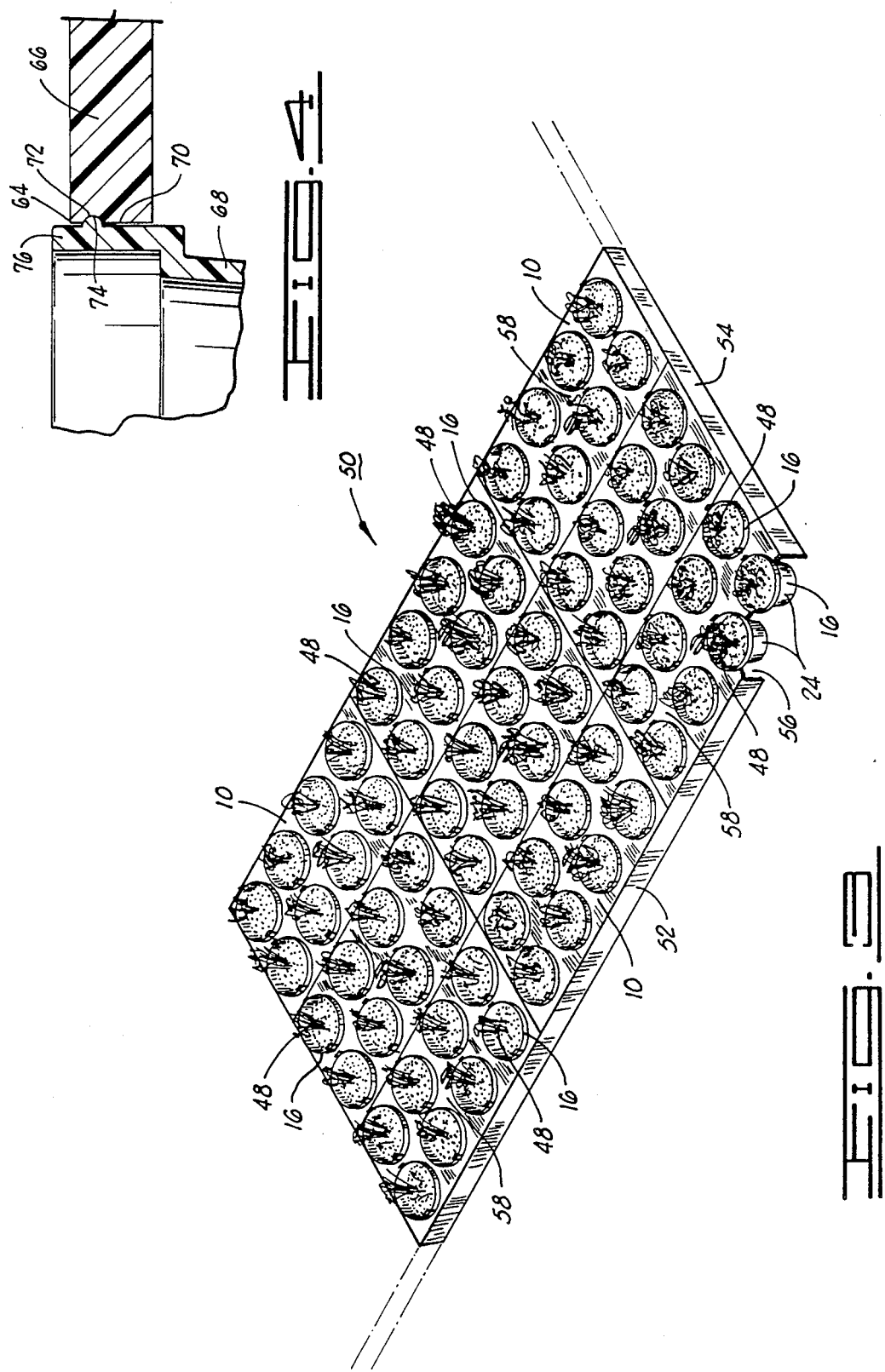

PLANT CONTAINER HANDLING AND PROTECTION SYSTEM

BACKGROUND OF THE INVENTION

1. Field of the Invention

The invention relates generally to a frame for handling and protection of a multiple of newly started nursery plants and, more particularly, but not by way limitation, it relates to an improved plant handling frame of increased structural strength that enables plant protection as well as movement or handling of multiple plant containers in unison.

2. Description of the Prior Art

The prior art includes a number of different types of tray, frame or the like that are adapted for handling of multiples of newly germinated plants in separate individual containers that are specifically constructed for breakaway, easy removal at time of setting or planting in permanent placement. In general, such trays or multiple plant holding structures are directed to formations for containing a predetermined number of relatively small plants or seedlings, and the structures are necessarily characterized by low cost construction and destructive disassembly when removing the plant seedlings.

The U.S. Pat. No. 3,825,126 illustrates one form of grate-tray for containing flower pots as set down within each of a plurality of receiving rings which are further arrayed into a rectangular formation of rows and columns of predetermined size. The tray structure is particularly adapted for stacked disposition of trays when not in use in order to conserve space while also serving to support the plant containers upward away from a lower surface during operational usage. U.S. Pat. No. 3,660,934 discloses yet another form of molded expandable nursery tray having a selected plurality of individual germination spaces, with each of the individual trays being adapted for ready sliding and stacking within mailing containers. The structure is dictated by the functions requisite a shipping container application. A number of other trays, shipping packages and flats have been known, but these structures generally depart from the structure and functions of the present invention in accordance with exigencies of their particular application.

SUMMARY OF THE INVENTION

The present invention relates to an improved plant container frame of considerable rigidity and strength which provides to growing young plants both protection and ease of handling in and about a nursery area. The invention consists of a unitarily formed frame of requisite structural rigidity having a plurality of plant-receiving holes disposed therein in uniform array, generally an array of rows and columns in selected spacing. Each of the holes includes an annular shoulder for supporting a mating shoulder of a plant container resting therein as well as one or more bendable container retainers that clamp over the upper edge of the container when in normal position. Each frame of a preset number of holes also includes a centrally located handle or lifting means while also having edge joinder means around the periphery so that a plurality of the frames may be releasably joined at the edges to other frames, as many in number as can reasonably be handled by an associated carrying or lifting mechanism. Plant containers assembled within one or more frames are allowed to rest directly on the respective container bottoms thereby to enhance heat exchange between the soil container and the supporting earth.

Therefore, it is an object of the present invention to provide a plant carriage frame for reducing the time and cost involved in handling a large plurality of plants through periods of germination, seedling growth and maturation.

It is also an object of the present invention to provide a multiple plant handling frame that enables most beneficial protection from external heat influences.

It is further an object of the invention to provide a plant container frame that is more economical as it contributes to protection and handling of plants from initial germination to permanent placement.

It is yet another object of the invention to provide a plant frame capable of supporting a relatively large number of heavier plant containers that remain in contact with the earth while being surrounded by dead air space.

Finally, it is object of the present invention to provide a frame for handling and protection of a selected plurality of plants, which frame may be modularly connected to form a much larger container frame array.

Other objects and advantages of the invention will be evident from the following detailed description when read in conjunction with the accompanying drawings which illustrate the invention.

BRIEF DESCRIPTION OF THE DRAWINGS

FIG. 1 is a view in perspective of a frame unit with a selected number of containers disposed therein;

FIG. 2 is a vertical section through an edge portion of a plant frame including a container hole and container;

FIG. 3 is a perspective view of a plurality of frame units in operational juncture with plant containers disposed therein; and FIG. 4 is a partial section showing an alternative form of structure for locking containers into holes.

DETAILED DESCRIPTION OF THE INVENTION

FIG. 1 illustrates a frame unit 10 consisting of a generally planar frame 12 having a plurality of container holes 14 for supporting respective plant containers 16. The frame units 10 of the present invention are designed with an eye toward handling of larger sized containers 16, e.g., one-gallon plant containers, but it should be understood that the number and array of container holes 14 is as variable as is the size and configuration of containers to be handled. Each of the container holes 14 includes clamping and sealing structure, as will be discussed below, for retaining the respective container 16 downward therein so that the respective container bottoms can rest on the earth beneath for optimum heat transfer as the frame unit or units 10 contribute to provide a wind shield protective structure.

Referring also to FIG. 2, each hole 14 is formed with an upper side wall 18 and lower annular shoulder 20 in order to provide plant container support. Mating containers 16 may be formed with generally cylindrical side walls 22 having flat bottom 24 for heat exchanging engagement with a supporting earth surface 26 or the like. The upper portion of container 16 is formed with an upper rim 28 which defines an outwardly extending annular shoulder 30. Thus, annular shoulder 30 rests upon the upper surface 32 of frame annular shoulder 20.

One or more manually operable retainers 34 are affixed at optimum spacing about each hole 14. Each of retainers 34 is formed with a boss 36 oriented radially over the respective hole 14 and adapted for removable positioning over an upper rim edge 38 of a respective container 16 thereby to retain each container 16 within its respective hole 14 when in operation. While a single retainer 34 might be sufficient for proper operation of frame unit 10, it is preferable that two or more equi-spaced retainers 34 be provided around each hole 14.

While the individual frame units 10 could be constructed from suitable metal stock with accessories such as retainers 34 and edge joinder 40 (FIG. 2) formed and attached thereon, it is preferable that the frame units 10 be molded of a selected, structurally strong plastic of the commercially available type. It is contemplated that such molding process allow for unitary formation of such as the retainers 34 and edge joinder structure 40. The edge joinder structure 40 may be formed as a slot strip 42 defining a cavity or groove 44 and functioning in combination with a mating tongue strip 46. Thus, each frame unit 10, referring to FIG. 1 again, would have two adjoining sides formed with a slot strip 42 while the remaining two adjacent sides would be formed with tongue strip 46. In this manner, any number of frame units 10 could be secured in consecutive joinder in any orthogonal direction so long as each individual frame unit 10 was kept in the proper orientation to mate the tongue and slot strip members.

FIG. 3 illustrates an array so assembled wherein a plurality of frame units 10 are joined into a common structure with each frame unit 10 carrying a plurality of plants 48 in respective containers 16. Thus, although not specifically shown, each of frame units 10 is joined at all sides by a mating tongue and slot joinder, i.e., tongue strips 46 and slots strips 42 (FIG. 1), and the overall frame unit array 50 may be continually expanded and made as large as practical for access and handling. Side strips 52, 54, formed to proper height and length from selected material, may be applied in suitable affixure around the frame unit array 50 in order to assure maximum dead air space within the volume 56, i.e., the intra-container space between the frames 10 and the earth surface 26 or other lower support surface.

Handling of a large array 50 may be effected by lifting with a suitable bail structure as it attaches in respective grip holes 58 as formed in central, balanced relationship in each of frame units 20 (see FIG. 1). When in stored attitude, the grip holes 58 formed in each of frame units 12 may be suitably closed by a mating plug. Alternatively, and especially if mechanical handling is to be effected, a suitable hoisting eye-ring or the like may be secured on the respective frame units 10. Also, as shown in FIG. 2, support of a plurality of containers 16 approaching one-gallon in size will require a frame member of considerable rigidity. Therefore, it is contemplated that the frame 12 may be formed with a honeycomb or other rigidifying underside structure such as a network of crossed longitudinal ribs 60 and 62. The transversely aligned ribs 60 and 62 may be formed unitarily beneath frame panel 12 between respective holes 14.

In operation, nursery stock in a plurality of containers 16 is inserted in interlocked positioning within respective holes 14 of one or more frame units 10. A number of individual frame units 10 can then be securely interconnected by joinder of respective slot strips 42 with adjacent tongue strips 46 to provide an air-sealed affixure. In like manner, each of the containers 16 seats down within its respective hole 14 as held by retainers 34 with downward facing shoulder 30 seated upon upward facing surface 32 of annular shoulder 20, once again providing an air-sealed joinder. Then, as the frame unit array 50 is operationally completed, suitable side panels 52 and 54 may be affixed therearound between the surface and top of the respective frame units 10 so that the intra-container space 56 thereunder achieves a considerable dead air condition. The bottoms 24 of each individual container 16 will be resting in firm engagement on the supporting surface, e.g., the earth surface.

A key advantage of the frame units 10 is the fact that they affix in sealed manner about the upper rim 28 of the containers 16 in order to best maintain the intra-container dead air space as each of the container bottoms 24 rests upon the under supporting surface 26. Blocking of the sides of frame array 50 (FIG. 3) using fitted side panels 52, 54 will then maintain the dead air space 56 to maximum degree. Thus, in extreme weather, hot or cold, maintaining dead air space 56 aids in protecting the fine root systems developing within containers 16 as a heat insulative effect is established by the still air.

In addition, maintaining of the container bottoms 24 in contact with the under supporting earth surface 26 provides maximum heat transfer between the earth and the bottom of the container thereby to provide further protection against either heat or cold extremes. It is well established as to the density and thermal properties of selected soil materials. Reference is made to "Microclimate—The Biological Environment" Second Edition, Rosenberg, published by John Wiley & Sons. Published tests establish dead air as having a thermal conductivity of $2.089 \times 10^{-2}$ whereas light soil with roots will have a value of $1.131 \times 10^{-1}$ and wet sandy soil will have a thermal conductivity of $6.398 \times 10^{-3}$. It should be noted here that the wet sandy soil will be more typical of the soil mix/moisture conditions in the bottom of a nursery pot such as containers 16.

It may be noted that water causes the highest thermal capacity of any substance in soil, and because of the moisture that is nearly always present beneath the bottom of container 16 and the soil surface 26, the heat transfer between the earth and the container will be enhanced to provide a distinct heat transfer advantage. Thus, in either cold or hot ambient temperature conditions, the earth contact of individual containers 16 aids in maintaining advantageous heat transfer and averaging of soil temperatures within the containers while intra-container dead air space 56 provides resistance to radiative heat influences.

An ancillary and equally important advantage of the present invention is its enablement in labor savings. Labor is the greatest single expense involved in producing nursery stock in volume as up to sixty percent (60%) of total production costs may be attributed to labor. A typical one-gallon container may be handled nine to twelve times before the plant finally arrives at a designated retail outlet. At present, all movement of container nursery stock is carried out by hand, particularly handling and movement of the larger plant containers. Thus, the present invention provides a structurally strong frame unit 10 which can be assembled in multiples to form frame arrays 50 carrying large numbers of individual plant containers, and such arrays may be moved unitarily by suitable automated means or by hand as an individual can still move two frame units 10 at once to provide handling of a considerable multiple of plants in a single effort.

FIG. 4 illustrates an alternative form of container locking structure that may be utilized with the basic frame/container structure. Thus, each container hole 64 of frame 66 releasably secures by means of a detent structure to each respective container 68. The inner side wall 70 of hole 64 includes formation of an annular, semi-circular groove 72. A mating bead 74 is then formed around each container collar 76. The groove 72 and bead 74 are preferably formed around the upper extremities of respective side wall 70 and collar 76 to assure greater radial flexure in opening and closing the detent structure during removal and insertion of containers 68. Also, it may be desirable to form container bead 74 in discontinuous manner to vary or adjust the insertion pressure required for fastening containers 68 in operative placement in respective frame holes 64.

The foregoing discloses a novel plant container handling and protection system in the form of a container frame for holding a plurality of plant containers which frames can be assembled in sealed manner into multiples to form a container array. Use of the system provides protection of roots from excess heat during summer because the frame surface absorbs solar energy that is reradiated as long wave radiation and the plant roots below the frame surface are protected as only moderate heating takes place. In winter, plant roots are protected by means of the intracontainer dead air space provided by the frame units. Individual frame units of the invention may be employed in multiples to provide a relatively sealed array that not only protects heat transfer within the container soil medium, but also maintains plant containers upright against wind effects while also affording capability of moving large numbers of containers in a single effort.

Changes may be made in combination and arrangement of elements as heretofore set forth in the specification and shown in the drawings; it being understood that changes may be made in the embodiments disclosed without departing from the spirit and scope of the invention as defined in the following claims.

What is claimed is:

1. A frame for releasably holding a plurality of plant containers that are free for engagement with the earth's surface, comprising:
   a plurality of plant containers having flat bottoms and to be retained in engagement with the earth's surface to allow continual heat transfer;
   frame means of generally planar form having a plurality of spaced holes therein for receiving said plurality of plant containers passed downwardly therethrough;
   interfering means formed around each of said spaced holes to engage the upper portion of a respective plant container thereby to support the container while preventing complete downward passage through the respective hole; and
   plural locking means affixed to said frame means adjacent each of said plurality of spaced holes to secure releasably the respective plant containers therein against upward movement relative to said frame means once the respective plant containers have been passed downwardly through the spaced holes into engagement with said interfering means.

2. A frame as set forth in claim 1 which further includes:
   gripping means formed in said frame means in central, balanced location to permit ready lifting and movement.

3. A frame as set forth in claim 1 wherein:
   said frame means is rectangular in form.

4. A frame as set forth in claim 3 which further includes: interlocking means formed on each edge of said frame means to permit interconnection of plural frame means each carrying a respective plurality of plant containers.

5. A frame as set forth in claim 4 wherein said interlocking means comprises:
   first and second slot strips formed along two adjacent edges of said frame means; and
   first and second tongue strips formed along the remaining adjacent edges of said frame means.

6. A frame as set forth in claim 5 which further comprises:
   a plurality of said frame means each releasably holding a plurality of plant containers as secured in a planar array of side-by-side interconnection of said respective slot strips and tongue strips.

7. A frame as set forth in claim 1 wherein said interfering means comprises:
   an annular shoulder formation formed within each said hole and of reduced dimension to engage a lower surface of an annular shoulder of said respective container.

8. A frame as set forth in claim 1 wherein said locking means each comprise:
   a resilient formation on said frame means which is normally disposed to extend over a portion of said plant container but bendable to release the respective container for upward movement and separation relative to said frame means.

9. A frame as set forth in claim 8 wherein said interfering means comprises:
   an annular shoulder formation formed within each said hole and of reduced dimension to engage a lower surface of an annular shoulder of said respective container.

10. A frame as set forth in claim 9 which is further characterized in that:
    said frame means including said interfering means and plural locking means is unitarily formed from plastic.

11. A frame as set forth in claim 1 which is further characterized in that:
    said frame means including interfering means and plural locking means is unitarily formed from plastic material.

12. A frame as set forth in claim 1 which is further characterized to include:
    at least one side strip suitably affixed around said frame means to assure maximum dead air space in the volume beneath the frame means.

13. A plurality of plant containers and a frame for releasably holding the plant containers whereby they are free for engagement with the earth's surface comprising:
    frame means of generally planar form having a plurality of spaced holes therein for receiving a plurality of plant containers therethrough;
    a plurality of plant containers, each of said containers being formed with a bottom surface enabling optimum engagement with a supporting surface and each of said containers being received through a respective one of said spaced holes so that the bottom surface of each container is disposed below said frame means to engage the supporting surface in heat transfer relationship between the supporting surface and the bottom surface of each container for protecting against temperature extremes; interfering means formed around each of said spaced holes to engage the upper portion of a respective plant container thereby to support the container while preventing complete passage through the respective hole; and locking means affixed to said frame means adjacent each of said plurality of spaced holes for releasably securing the respective plant containers therein.

14. A plurality of plant containers and a frame as set forth in claim 13 wherein:

each of said containers has a flat bottom surface.

15. A plurality of plant containers and a frame as set forth in claim 14 wherein:

each of said containers is formed with an upper rim defining a downward facing annular shoulder that fits in relatively sealed manner against said interfering means in each of said spaced holes.

16. A plurality of plant containers and a frame as set forth in claim 15 wherein said locking means includes:

at least one retainer strip formed to extend perpendicularly from said frame means adjacent each said hole and including a boss that is normally retained over a respective container upper rim but bendable radially outward of the container hole to release the respective container for removal.

17. A plurality of plant containers and a frame as set forth in claim 13 which further includes:

at least one side strip suitably affixed around said frame means to assure maximum dead air space in the volume beneath the frame means.

18. A plurality of plant containers and a frame for releasably holding the plant containers whereby they are free of engagement with the earth's surface, comprising:

frame means of generally planar form having a plurality of spaced holes therein for receiving a plurality of plant containers therethrough;

a plurality of plant containers disposed in said holes each having an interfering structure formed around the periphery of the upper portion and having the lower portion formed with a flat bottom surface which is in engagement with the earth's surface to allow continual heat transfer;

interfering means formed around each of said spaced holes to engage said interfering structure formed around the periphery of the upper portion of a respective plant container upon downward insertion thereby to support the container while preventing complete passage through the respective hole; and releasable locking means adjacent each hole for engagement over the container upper portion.

19. A plurality of plant containers and a frame as set forth in claim 18 wherein each of said interfering means and mating interfering structure comprise:

annular groove means formed around the upper side wall of the frame hole; and annular bead means formed around the upper portion of the respective container.

20. A plurality of plant containers and a frame as set forth in claim 18 which further inludes:

gripping means formed in said frame means in central, balanced location to permit ready lifting and movement.

21. A plurality of plant containers and a frame as set forth in claim 18 wherein:

said frame means is rectangular in form.

22. A plurality of plant containers and a frame as set forth in claim 21 which is further characterized to include:

first and second slot strips formed along two adjacent edges of said frame means; and first and second tongue strips formed along the remaining adjacent edges of said frame means.

23. A plurality of plant containers and a frame as set forth in claim 22 which further comprises:

a plurality of said frame means each releasably holding a plurality of plant containers as secured in a planar array by side-by-side interconnection of said respective slot strips and tongue strips.

24. A plurality of plant containers and a frame as set forth in claim 19 that is further characterized in that:

said annular bead means is discontinuous in spaced disposition around said frame hole.

* * * * *